United States Patent
Marupaduga (10) Patent No.: US 11,490,301 B1
(45) Date of Patent: Nov. 1, 2022

(54) DELAYING HANDOVERS BASED ON INTERMODULATION DISTORTION

(71) Applicant: Sprint Spectrum LP, Overland Park, KS (US)

(72) Inventor: Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/094,112

(22) Filed: Nov. 10, 2020

(51) Int. Cl.
| | |
|---|---|
| *H04W 36/00* | (2009.01) |
| *H04W 36/14* | (2009.01) |
| *H04W 36/08* | (2009.01) |
| *H04W 76/30* | (2018.01) |
| *H04W 88/06* | (2009.01) |

(52) U.S. Cl.
CPC . *H04W 36/00837* (2018.08); *H04W 36/0069* (2018.08); *H04W 36/08* (2013.01); *H04W 36/14* (2013.01); *H04W 76/30* (2018.02); *H04W 88/06* (2013.01)

(58) Field of Classification Search
CPC ........... H04W 72/082; H04W 72/0453; H04W 36/00837; H04W 36/0069; H04W 36/08; H04W 36/14; H04W 76/30; H04W 88/06
See application file for complete search history.

(56) References Cited

U.S. PATENT DOCUMENTS

| | | | | |
|---|---|---|---|---|
| 5,239,675 | A | * 8/1993 | Dudczak | H04B 1/1027 455/222 |
| 2020/0136732 | A1 | * 4/2020 | Verma | H04B 17/0085 |
| 2020/0313834 | A1 | * 10/2020 | He | H04W 76/15 |

FOREIGN PATENT DOCUMENTS

KR 20110036943 A * 4/2011 ...... H04W 36/00837

* cited by examiner

*Primary Examiner* — Erica Navar (57) ABSTRACT

Methods and systems for preventing or delaying handovers to target access nodes that are experiencing intermodulation distortion. Ensuring service quality in dual-connectivity (EN-DC) wireless networks includes determining that a target access node for a handover of a wireless device is experiencing an intermodulation distortion level that exceeds a first threshold, and adjusting handover thresholds to delay the handover of the wireless device to the target access node. If the handover is necessary, dual-connectivity is disabled for the wireless device.

14 Claims, 7 Drawing Sheets

DELAYING HANDOVERS BASED ON INTERMODULATION DISTORTION

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. As wireless technology continues to improve, various different iterations of radio access technologies (RATs) may be deployed within a single wireless network. Such heterogeneous wireless networks can include newer 5G and millimeter wave (mmW) networks, as well as older legacy networks (such as 3G). In some cases, deployment of 5G new radio (NR) access nodes alongside or co-located with 4G long-term evolution (LTE) access nodes utilizes dual connectivity technology (e.g. EN-DC), wherein control information is transmitted using the 4G RAT and data is transmitted using the 5G RAT. There are various potential deployments of EN-DC, such as one-to-one (where a 4G eNodeB is colocated with a 5G gNodeB at the same cell site or radio access network), or one-to-many (where a 4G eNodeB at a first radio access network is coupled via X2 links to many different 5G gNodeBs, each within their own radio access network or cell site). Each radio access network (RAN) or cell site can further include a cell site router, which provides connectivity to other network elements, such as an intermediate or core network. The connection between the cell site router and other network elements closer to the core network may be referred to as a mobile backhaul.

Further, as wireless device technology improves, increasing numbers of wireless devices are using various transmission modes dual connectivity and multiple input multiple output (MIMO). However, transitioning to these advanced technologies in today's heterogeneous wireless networks can be associated with problems. In particular, load balancing of wireless devices between two or more neighboring access nodes can be problematic, particularly when access nodes suffer from intermodulation distortion caused by various different sources. For example, access nodes configured to deploy multiple carriers/frequencies (including while operating in a dual-connectivity mode) may suffer from $3^{rd}$ order intermodulation distortion caused at the antennae of the access node by products of the different frequencies. Further, passive intermodulation distortion can be caused by components of the access nodes themselves. $3^{rd}$ order or passive intermodulation distortion can impact a quality of service provided by the access node. Particularly when many wireless devices, and operating in dual-connectivity mode, the quality of service for the wireless devices can be impacted. Thus, standard handovers of these wireless devices, which may be triggered by poor or deteriorating signal conditions from a serving access node, would not benefit the wireless devices if the target access nodes suffer from intermodulation distortion, despite providing better signal conditions.

Overview

Exemplary embodiments described herein include methods, systems, and processing nodes for preventing or delaying handovers to target access nodes that are suffering from intermodulation distortion. An exemplary method for ensuring service quality in wireless network suffering from intermodulation distortion includes determining that a target access node for a handover of a wireless device is experiencing an intermodulation distortion level that exceeds a first threshold, and delaying the handover of the wireless device to the target access node.

Another exemplary method for delaying handovers to target access nodes suffering from intermodulation distortion includes determining that an intermodulation distortion level measured at a target access node meets a threshold, and for wireless devices attached to a serving access node adjacent the target access node, adjusting handover thresholds to delay handovers of the wireless device to the target access node.

Another exemplary method for delaying handovers includes determining a requirement for a handover of a wireless device from a source access node to a target access node that is suffering from threshold levels of intermodulation distortion, and delaying the handover of the wireless device to the target access node.

The exemplary embodiments described herein may be performed by a processing node within a system, such as a telecommunication system. For example, an exemplary system for delaying handovers can include a processing node that is configured to perform any of the disclosed operations in various combinations.

DETAILED DESCRIPTION

The following disclosure provides methods and systems for delaying handovers of dual-connectivity wireless devices to target access nodes if the target access nodes are experiencing threshold amounts of intermodulation distortion. This can further include performing delayed handovers of the dual-connectivity wireless devices if necessary, and disabling the dual-connectivity mode of operation if the intermodulation distortion is associated with one of the carriers in the dual-connectivity mode of operation. The handover may initially be required if signal conditions change for the wireless device, or via any other known mechanism for triggering a handover. However, if the target access node suffers from intermodulation distortion (e.g. passive intermodulation distortion or PIM), then the handover is delayed. The handover may be delayed by modifying the signal condition thresholds, e.g. minimum or maximum signal levels. Further, if the handover still occurs (e.g. if the modified signal level thresholds are met), and if the intermodulation distortion persists or meets another threshold, then the dual-connectivity mode of operation is disabled. The dual-connectivity mode may be disabled by removing context info related to the wireless device from handover signaling.

For example, if the dual-connectivity mode utilizes 4G LTE and 5G NR (e.g. EN-DC), and if the target access node suffers from PIM at a 5G gNodeB (or frequencies associated therewith), then when the wireless device is handed over to the target access node, the 5G NR data value is disabled, such that when the handover is complete, the wireless device attaches only to the 4G LTE carrier deployed by the target access node. Various combinations of these operations are described herein, including in collocated EN-DC systems (comprising a 4G LTE eNodeB and 5G NR gNodeB within the same radio access network or RAN), and distributed or one-to-many EN-DC systems (comprising a 4G LTE eNodeB at a first RAN, and different 5G gNodeBs at different RANs respectively).

Delaying handovers can include adjusting handover thresholds. A signal quality reported by the wireless device is monitored, wherein the handover thresholds are adjusted such that the signal quality does not deteriorate past a threshold. For example, if a target access node has a low bandwidth, then a handover threshold associated with the target access node is raised, such that a handover of the wireless device to the target access node is prevented or discouraged. Adjusting the handover threshold may include increasing or raising a threshold signal level associated with the target access node. The adjustment may further comprise decreasing or lowering a threshold signal level of the serving access node, such that the wireless device remains attached to the serving access node for a longer time.

Therefore, as described herein, a processing node (communicably coupled to, for example, a serving or source access node) is configured to perform operations ensuring service quality in wireless network suffering from intermodulation distortion by determining that a target access node for a handover of a wireless device is experiencing an intermodulation distortion level that exceeds a first threshold. And delaying the handover of the wireless device to the target access node. Delaying the handover comprises adjusting handover thresholds associated with one or both of a source access node or the target access node. The adjusted handover thresholds can be transmitted to the wireless device. In an exemplary embodiment, the handover threshold comprises a signal level that is adjusted from −102 dBm to −110 dBm. For example, the wireless device may be near a cell edge of the source access node and, therefore, request a handover to an adjacent neighboring target access node. Further, adjusting the handover thresholds can be performed iteratively based on different thresholds of the intermodulation distortion level, so as to delay the handover as long as possible.

In exemplary embodiments described herein, the wireless device and source access node are configured to utilize a dual-connectivity operating mode with at least two different radio access technologies (RATs). For example, access nodes described herein can communicate using a plurality of radio air interfaces. For example, the access node can include a combination of a 4G eNodeB and a 5G gNodeB. In other words, the access node can be configured to communicate using 4G LTE as well using 5G NR. Further, the access node can include a plurality of antennae (or antenna elements). Each antenna element can be configured to deploy a different radio air interface using a different frequency. For example, each antenna element can be configured to deploy a 4G LTE air interface or a 5G NR air interface. Different quantities of antenna elements can be configured to deploy (or "assigned" to) a different type of air interface, depending on the needs of a network operator or users.

Further, the intermodulation distortion measured at the target access node is associated with a first RAT of the at least two RATs. For example, the intermodulation can be measured at antenna elements associated with the 5G NR air interface. Further, the intermodulation distortion level can exceed a second threshold higher than first threshold, upon which the dual-connectivity operating mode is disabled. Since the handover cannot be delayed any longer, the wireless device attaches to the target access node using only one RAT. Disabling the dual-connectivity operating mode can further include removing context information for the first RAT from a handover context message transmitted to the target access node. The first RAT can be the 5G NR RAT. Thus, the handover is performed such that the wireless device attaches to the target access node using the second RAT. Since performing the handover is preferable versus a significantly diminished signal quality, the handover is performed using the RAT that is not affected by the intermodulation distortion. In embodiments described herein, the target access node can include a separate dual-connectivity access node, wherein the serving access node comprises a primary access node, and the target access node comprises a secondary access node in a one to many configuration, such that the handover is performed between two secondary access nodes.

These operations may be performed by an exemplary system described herein and comprising at least a processing node and a processor coupled to the processing node, and similar operations may be performed by a processing node communicatively coupled to any other network node within the wireless network. These and other embodiments are further described herein and with reference to FIGS. 1-8.

Figure 1:
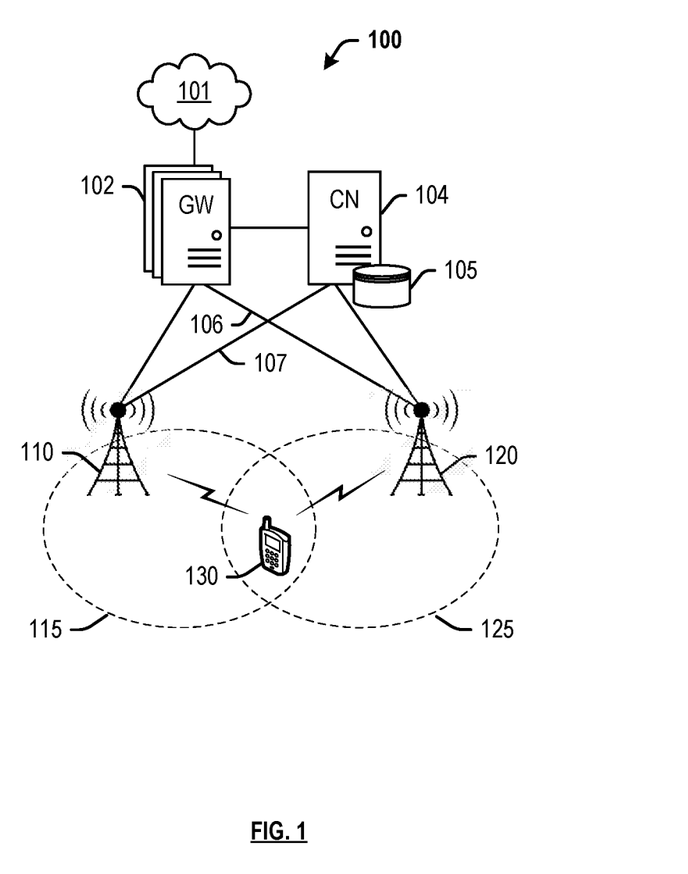
FIG. 1 depicts an exemplary system for delaying handovers based on intermodulation distortion.

FIG. 1 depicts an exemplary system 100 comprising a communication network 101, gateway 102, controller node 104, access nodes 110, 120, and wireless device 130. In this exemplary embodiment, each of access nodes 110, 120 may be configured to deploy at least two wireless air interfaces, including 4G LTE and 5G NR. Each wireless air interface may be configured to utilize a different frequency band or sub-band, a different channel size or bandwidth, and so on. For example, the 5G NR interface may be configured to utilize higher frequencies and larger channel bandwidths than the 4G LTE interface. Further, each access node 110, 120 can be configured to deploy at least two wireless air interfaces using dual connectivity. For example, each access node 110, 120 can include a combination of an eNodeB and a gNodeB, such that each access node is configured to deploy a wireless air interface using a first RAT (e.g. 4G LTE) and a second RAT (e.g. 5G NR). Further, each access node 110, 120 can be configured to communicate using both RATs at the same time. For example, dual connections can be set up with wireless device 130 using both 4G and 5G wireless air interfaces, with the 4G wireless air interface being used to transmit control information, and the 5G wireless air interface being used to transmit data information. In another example, either control or data transmissions may be transmitted using either 4G or 5G wireless air interface. In another example, a standalone 5G access node may be configured to deploy multiple 5G wireless air interfaces. Other implementations may be evident to those having ordinary skill in the art in light of this disclosure. Further, while access nodes 110, 120 and wireless device 130 are illustrated in FIG. 1, system 100 can include various other combinations of carriers/wireless air interfaces, antenna elements, access nodes, and wireless devices, as may be evident to those having ordinary skill in the art in light of this disclosure.

A processing node within system 100 (for example, communicatively coupled to access node 110 or any other network node) can be configured to delay handovers of wireless device 130 to a target access node suffering from high intermodulation distortion levels. Delaying the handover comprises adjusting handover thresholds associated with one or both of a source access node or the target access node. In LTE and 5G systems, such a pair of triggers is known as an A4 measurement. Other combinations of handover triggers may be within the purview of those having ordinary skill in the art in light of this disclosure. In an exemplary embodiment, the triggers may comprise thresholds, offsets, or hysteresis values for an A4 measurement event, A5 measurement event, B1 measurement event, or B2 measurement event (e.g., when implementing an LTE network). For example, in an A5 event, a received first signal level plus a hysteresis may be compared to a first threshold and a received second signal level plus offsets minus a hysteresis may be compared to a second threshold. The first received signal level may comprise a received signal level from the first access node and the second received signal level may comprise a received signal level from a target access node, where the first and seconds signals are received at the wireless device 130. Some example signal levels may comprise a Received Signal Strength Indicator, (RSSI), Reference Signal Received Quality (RSRQ), RSRP, or any other suitable signal level.

The adjusted handover thresholds are transmitted to the wireless device 130. Further, adjusting the handover thresholds can be performed iteratively based on different thresholds of the signal quality. For example, a signal quality reported by the wireless device 130 is monitored, and the handover thresholds are adjusted such that the signal quality does not deteriorate past a threshold. Thus, adjusting the handover thresholds is performed iteratively based on different thresholds of the signal quality. In an exemplary embodiment, the handover threshold comprises a signal level that is adjusted from −102 dBm to −110 dBm. For example, the wireless device 130 may be near a cell edge of the source access node (e.g. access node 110) and, therefore, request a handover to an adjacent neighboring target access node (e.g. access node 120). Further, adjusting the handover thresholds can be performed iteratively based on different thresholds of the intermodulation distortion level, so as to delay the handover as long as possible. The intermodulation distortion measured at the target access node 120 is associated with a first RAT of the at least two RATs. For example, the intermodulation can be measured at antenna elements associated with the 5G NR air interface. Further, the intermodulation distortion level can exceed a second threshold higher than first threshold, upon which the dual-connectivity operating mode is disabled. Since the handover cannot be delayed any longer, the wireless device 130 attaches to the target access node 120 using only one RAT. Disabling the dual-connectivity operating mode can further include removing context information for the first RAT from a handover context message transmitted to the target access node 120 from the source access node 110. The first RAT can be the 5G NR RAT. Thus, the handover is performed such that the wireless device 130 attaches to the target access node 120 using the second RAT. Since performing the handover is preferable versus a significantly diminished signal quality, the handover is performed using the RAT that is not affected by the intermodulation distortion.

Access nodes 110, 120 can be any network node configured to provide communication between wireless device 130 and communication network 101, including standard access nodes such as a macro-cell access node, base transceiver station, a radio base station, an eNodeB device, an enhanced eNodeB device, a next generation or gigabit NodeB device (gNodeB) in 5G networks, or the like. In an exemplary embodiment, a macro-cell access node can have a coverage area in the range of approximately five kilometers to thirty-five kilometers and an output power in the tens of watts. Alternatively, access nodes 110, 120 may comprise any short range, low power, small-cell access nodes such as a microcell access node, a picocell access node, a femtocell access node, or a home eNodeB/gNodeB device.

Access nodes 110, 120 can comprise a processor and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other, and other access nodes (not shown), using a wireless link or a wired link such as an X2 link. Components of exemplary access nodes 110, 120 and processing nodes coupled thereto are further described with reference to FIGS. 2-3.

Wireless device 130 may be any device, system, combination of devices, or other such communication platform capable of communicating wirelessly with access nodes 110, 120 using one or more frequency bands deployed therefrom. Wireless device 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 130. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), S1, optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication links 106, 107 can be a direct link or might include various equipment, intermediate components, systems, and networks, such as a cell site router, etc. Communication links 106, 107 may comprise many different signals sharing the same link. Communication links 106, 107 may be associated with many different reference points, such as n1, n2, n3, n4, n5, n6, n7, etc., as well as s1, s3, s4, s5, etc.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW) associated with 4G LTE networks, or a user plane function (UPF) associated with 5G NR networks. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a session management function (SMF), access and mobility function (AMF), a home subscriber server (HSS), a policy control and charging rules function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as capabilities of access nodes 110, 120, past or current uplink usage requirements capabilities of wireless device 130, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, controller node 104, and/or network 101.

Figure 2:
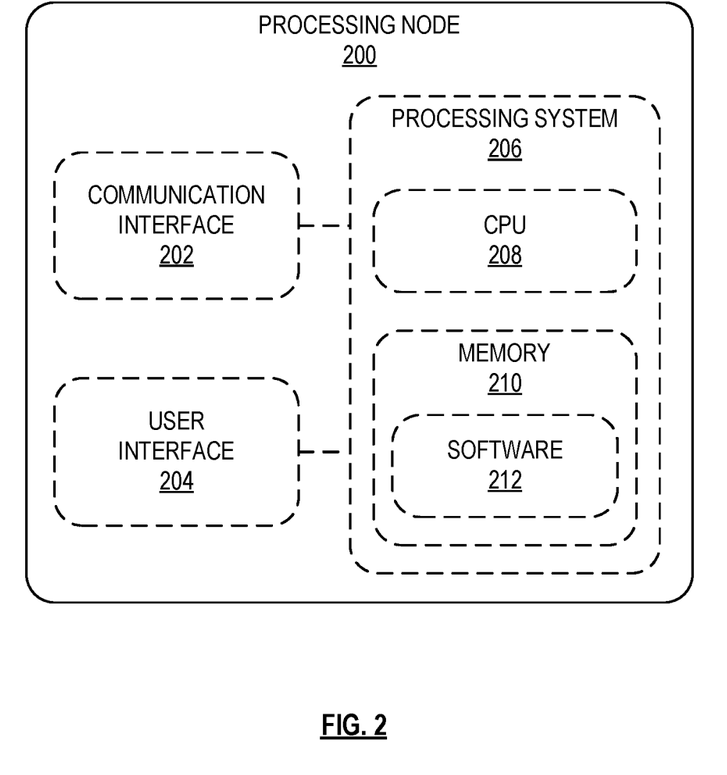
FIG. 2 depicts an exemplary processing node for delaying handovers based on intermodulation distortion.

FIG. 2 depicts an exemplary processing node 200. Processing node 200 comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Further, memory 210 can store a software 212, which may be executed to perform the operations described herein. In an exemplary embodiment, software 212 can include instructions for ensuring service quality in wireless network suffering from intermodulation distortion by determining that a target access node for a handover of a wireless device is experiencing an intermodulation distortion level that exceeds a first threshold, and delaying the handover of the wireless device to the target access node. In another exemplary method, software 212 can include instructions for delaying handovers to target access nodes suffering from intermodulation distortion by determining that an intermodulation distortion level measured at a target access node meets a threshold, and for wireless devices attached to a serving access node adjacent the target access node, adjusting handover thresholds to delay handovers of the wireless device to the target access node. In another exemplary method, software 212 can include instructions for delaying handovers by determining a requirement for a handover of a wireless device from a source access node to a target access node that is suffering from threshold levels of intermodulation distortion, and delaying the handover of the wireless device to the target access node.

Figure 3:
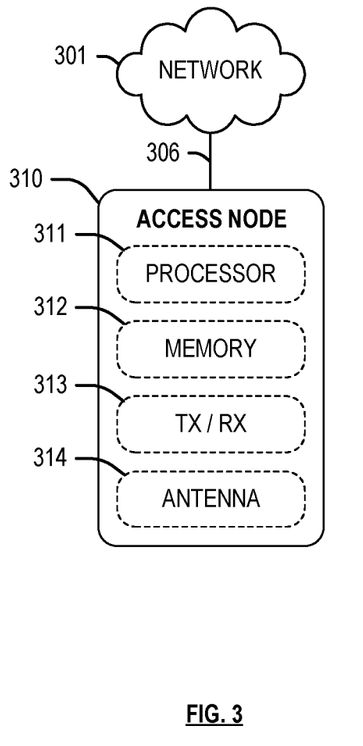
FIG. 3 depicts an exemplary access node for delaying handovers based on intermodulation distortion.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, a transceiver 313, and antennae 314 (hereinafter referred to as antenna elements 314). Processor 311 executes instructions stored on memory 312, and transceiver 313 (in conjunction with antenna elements 314) enable wireless communication respectively at least two wireless air interfaces, such as 4G LTE and 5G NR. For example, access node 310 may be configured to transmit control information using a first set of antennae elements 314 configured to utilize a 4G LTE interface, and data information using a second set of antennae elements 314 configured to utilize a 5G NR air interface. Alternatively or in addition, each separate air interface maintains its own control and data transmissions. Further, antenna elements 314 may include an array of antenna elements that are configured to deploy air interfaces over one or more wireless sectors, form beams within these sectors, employ multiple-input-multiple-output (MIMO), etc.

Exemplary instructions stored on memory 312 can include instructions for ensuring service quality in wireless network suffering from intermodulation distortion by determining that a target access node for a handover of a wireless device is experiencing an intermodulation distortion level that exceeds a first threshold, and delaying the handover of the wireless device to the target access node. In another exemplary method, memory 312 can include instructions for delaying handovers to target access nodes suffering from intermodulation distortion by determining that an intermodulation distortion level measured at a target access node meets a threshold, and for wireless devices attached to access node 310, adjusting handover thresholds to delay handovers of the wireless device to the target access node. In another exemplary method, memory 312 can include instructions for delaying handovers by determining a requirement for a handover of a wireless device from access node 310 to a target access node that is suffering from threshold levels of intermodulation distortion, and delaying the handover of the wireless device to the target access node.

Figure 4:
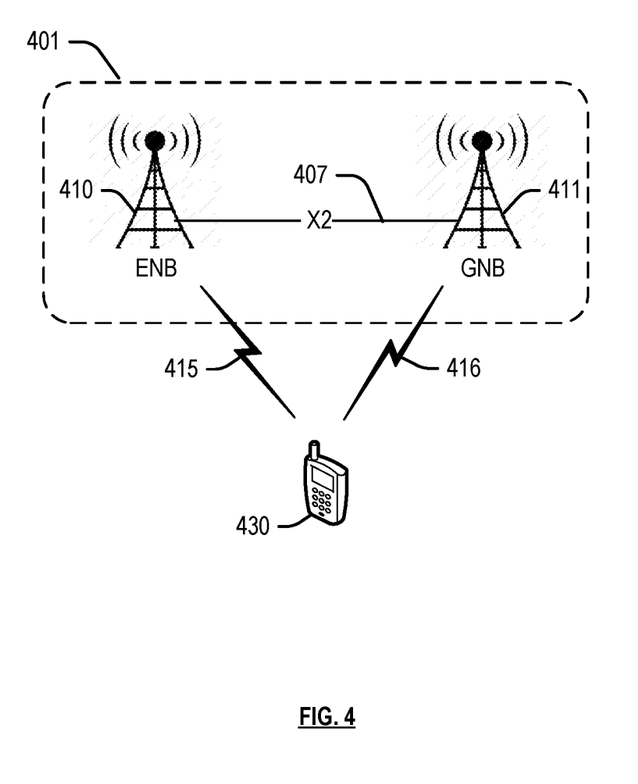
FIG. 4 depicts an exemplary 5G EN-DC radio access network comprising collocated access nodes.

FIG. 4 depicts an exemplary 5G EN-DC radio access network (RAN) 401 with colocated access nodes. RAN 401 can include other components not shown herein for convenience, such as cell site routers, controllers, etc. Further, RAN 401 may be connected to other intermediate or core networks. In this exemplary embodiment, the collocated access nodes can include a eNodeB 410, and a gNodeB 411. For example, eNodeB 410 can be configured to deploy a wireless air interface 415 using a first radio access technology (RAT), e.g. 4G LTE, and gNodeB 411 can be configured to deploy a second wireless air interface 416 using a second RAT, e.g. 5G NR and/or mmW. Each RAT can be configured to utilize a different frequency band or sub-band, a different channel size or bandwidth, and so on. For example, the 5G NR wireless air interface 416 can be configured to utilize higher frequencies and larger channel bandwidths than the 4G LTE wireless interface 415. In an exemplary embodiment, the 5G NR wireless interface can be configured to utilize mmW frequencies.

Further, eNodeB 410 and gNodeB 411 can be configured to communicate using both RATs at the same time. For example, dual connections can be set up with wireless device 430 using both 4G and 5G wireless air interfaces 415, 416 respectively, the 4G wireless air interface 415 being used to transmit control information, and the 5G wireless air interface 416 being used to transmit data information. For example, a processing node within RAN 401 (for example, communicatively coupled to eNodeB 410, gNodeB 411, or any other network node) can be configured to determine whether or not wireless device 430 is capable of communicating using both RATs (e.g. capable of 5G EN-DC), and instruct the eNodeB 410 to broadcast an indicator in, for example, a system information message. Responsive to the indicator, wireless device 430 can attach to eNodeB 410 which can use the 4G carrier to control and set up a dual connectivity session with the wireless device 430. In other words, control information (including SIB messages) is transmitted from the eNodeB 410 using the 4G LTE air interface, while the 5G NR air interface is utilized for transmission of data via gNodeB 411. Using the 5G RAT for data transmissions is advantageous, as 5G provides higher bandwidths and frequencies versus 4G. In addition, while different carriers offer different channel bandwidths, certain combinations of carriers may provide a greater aggregate channel bandwidth.

Further, within radio access network 401, eNodeB 410 and gNodeB 411 can be coupled via a direct communication link 407, which can include an X2 communication link for communicating control and data information. In an exemplary embodiment, gNodeB 411 includes logic to determine how to allocate data packets between eNodeB 410 and gNodeB 411, wherein the data packets flow between wireless device 430 and any external network node. Such logic may include a packet data convergence protocol (PDCP) function. Thus, RAN 401 can include a plurality of antenna elements (not shown herein) coupled to eNodeB 410 and gNodeB 411, with different antenna elements configured to deploy a different radio air interface using a different frequency.

Thus, the processing node within RAN 401 can be configured to perform operations for monitoring an intermodulation distortion level for a first carrier deployed by one or both of eNodeB 410 or gNodeB 411 and, responsive to the intermodulation distortion level meeting a threshold, delaying a handover of the wireless device 430 to the first carrier from any other carrier. The intermodulation distortion level can be associated with one or more of a passive intermodulation (PIM) distortion or a third or higher-order intermodulation distortion. For example, the third order distortion is associated with a combination of a high-frequency carrier (e.g. 5G carrier on wireless air interface 416) and at least one other carrier deployed by the access node (e.g. 4G LTE carrier on wireless air interface 415). The intermodulation distortion is monitored at one or more antennae of the eNodeB 410 or gNodeB 411. Responsive to the intermodulation distortion reaching one or more further thresholds, dual connectivity for the wireless device 430 can be disabled, such that the wireless device attaches to only one carrier. Adjusting handover thresholds can include signal level thresholds such as A1, A4, etc. to trigger or prevent handovers to different carriers.

Figure 5:
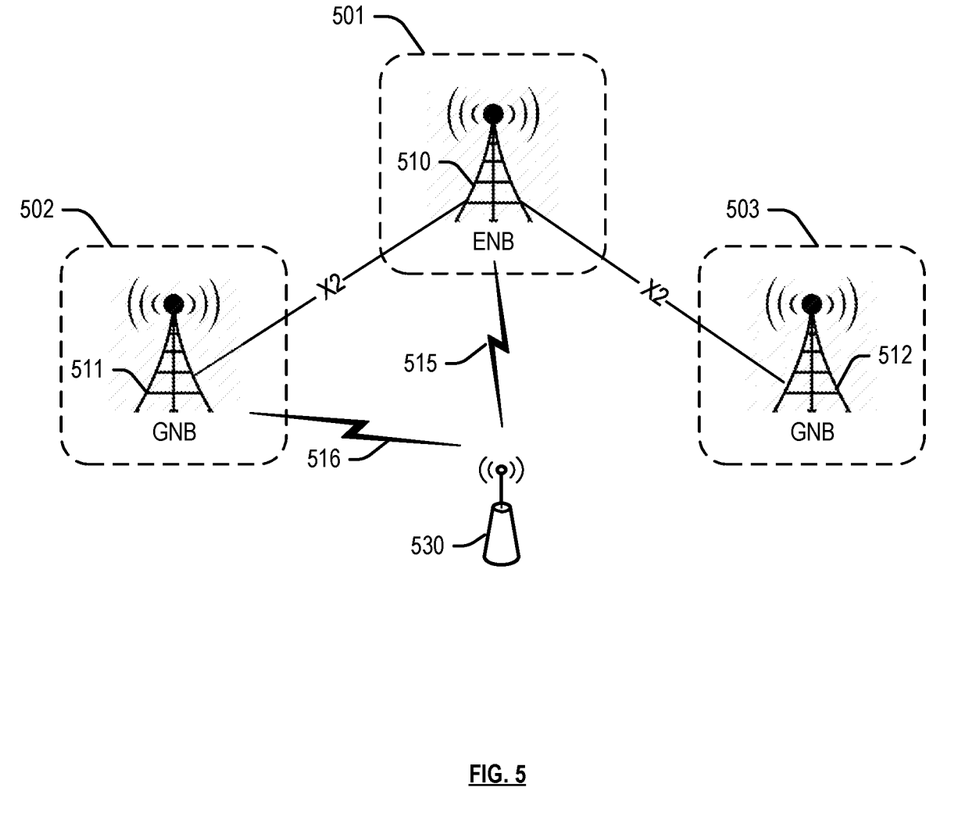
FIG. 5 depicts an exemplary 5G EN-DC radio access network comprising distributed access nodes.

FIG. 5 depicts another 5G EN-DC system using distributed access nodes. Each of RANs 501, 502, 503 includes at least one access node. This embodiment depicts a one-to-many configuration, in which an eNodeB 510 is designated as a primary access node for wireless devices (such as wireless device 530), and one or more gNodeBs 511, 512 are selected as secondary access nodes, as further described below. Persons having ordinary skill in the art may note that other components may be included in any combination, without materially affecting the scope and spirit of the described embodiments.

In this exemplary embodiment, eNodeB 510 can be configured to deploy a wireless interface 515 using a first radio access technology (RAT), e.g. 4G LTE, and gNodeBs 511, 512 can be configured to deploy wireless interfaces using a second RAT, e.g. 5G NR. Further, eNodeB 510 and gNodeBs 511, 512 can be configured to communicate using both RATs at the same time. For example, dual connections can be set up with one wireless device 530 using both 4G and 5G air interfaces respectively, the 4G wireless interface 515 being used to transmit control information, and one of the 5G wireless interfaces (e.g. 5G wireless interface 516) being used to transmit data information. For example, a processing node communicatively coupled to eNodeB 510 can be configured to determine whether or not wireless device 530 is capable of communicating using both RATs (e.g. capable of 5G EN-DC), and instruct the eNodeB 510 to broadcast an indicator in, for example, a system information message. Responsive to the indicator, wireless device 530 can attach to eNodeB 510 which can use the 4G carrier to control and set up a dual connectivity session with wireless device 530. Further, eNodeB 510 can be configured to select one (or more) of gNodeBs 511, 512 as a secondary access node, to transport user data. In other words, control information (including SIB messages) is transmitted from the eNodeB node 510 using the 4G LTE air interface, while the 5G NR air interfaces (e.g. 5G NR wireless air interface 516) is utilized for transmission of data. Further, gNodeBs 511 and 512 (hereinafter "secondary access nodes") can each be coupled to eNodeB 510 (hereinafter "primary access node") via X2 communication links. In an exemplary embodiment, each secondary access node can include logic to determine how to allocate data packets between the access nodes, wherein the data packets flow between wireless device 530 and a network node not shown herein. Such logic may include a packet data convergence protocol (PDCP) function.

Further, a processing node communicatively coupled to any of eNodeB 510 or gNodeBs 511, 512 can be configured to perform operations for monitoring an intermodulation distortion level for a first carrier deployed by one or both of gNodeBs 511, 512 (e.g. 5G NR carrier on wireless interface 516), and responsive to the intermodulation distortion level meeting a threshold, preventing a handover of wireless device 530 to the 5G NR carrier, as further described herein. These instructions can include adjusting handover thresholds, such as A1, A4, etc. to trigger or prevent handovers to different carriers. Various other combinations of these operations may be envisioned by those having ordinary skill in the art in light of this disclosure, including the operations further described below with reference to FIGS. 6-8.

Figure 6:
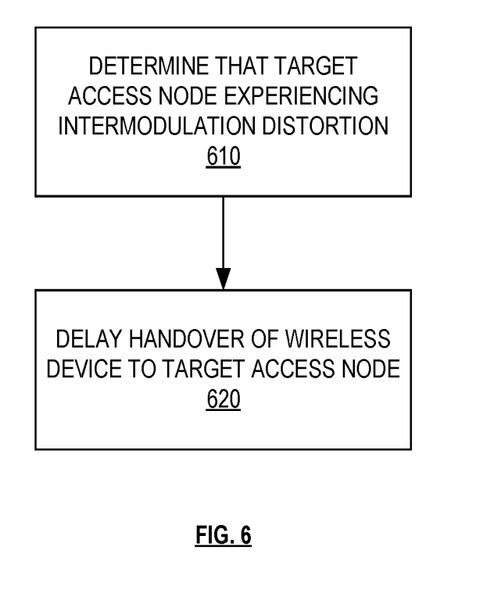
FIG. 6 depicts an exemplary method for delaying handovers based on intermodulation distortion.

FIG. 6 depicts an exemplary method for delaying handovers based on intermodulation distortion. The method of FIG. 6 may be implemented by a processing node communicatively coupled to one or more access nodes, controller nodes, or any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, it is determined that a target access node is suffering from intermodulation distortion and, at 620, a handover of the wireless device to the target access node is delayed. The handover may initially be required if signal conditions change for the wireless device, or via any other known mechanism for triggering a handover. For example, the wireless device may be near a cell edge of a serving access node, and determines that the signal level of the target access node is acceptable. However, if the target access node suffers from intermodulation distortion (e.g. passive intermodulation distortion or PIM), then the handover is delayed.

The handover may be delayed by modifying the signal condition thresholds, e.g. minimum or maximum signal levels. A signal quality reported by the wireless device is monitored, wherein the handover thresholds are adjusted such that the signal quality does not deteriorate past a threshold. For example, if a target access node has a low bandwidth, then a handover threshold associated with the target access node is raised, such that a handover of the wireless device to the target access node is prevented or discouraged. Adjusting the handover threshold may include increasing or raising a threshold signal level associated with the target access node. The adjustment may further comprise decreasing or lowering a threshold signal level of the serving access node, such that the wireless device remains attached to the serving access node for a longer time.

Figure 7:
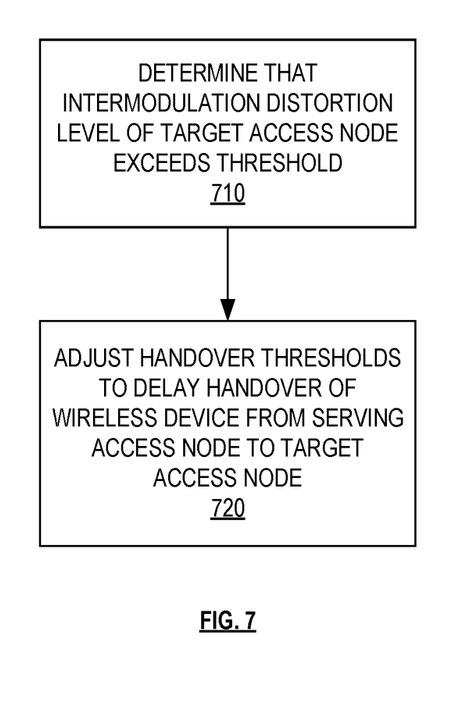
FIG. 7 depicts another exemplary method for delaying handovers based on intermodulation distortion.

FIG. 7 depicts an exemplary method for delaying handovers based on intermodulation distortion. The method of FIG. 7 may be implemented by a processing node communicatively coupled to one or more access nodes, controller nodes, or any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, it is determined that an intermodulation distortion level of a target access node meets a threshold and, at 720, a handover of the wireless device to the target access node is delayed. The handover may initially be required if signal conditions change for the wireless device, or via any other known mechanism for triggering a handover. For example, the wireless device may be near a cell edge of a serving access node, and determines that the signal level of the target access node is acceptable. However, if the target access node suffers from intermodulation distortion (e.g. passive intermodulation distortion or PIM), then the handover is delayed.

The handover may be delayed by modifying the signal condition thresholds, e.g. minimum or maximum signal levels. A signal quality reported by the wireless device is monitored, wherein the handover thresholds are adjusted such that the signal quality does not deteriorate past a threshold. For example, if a target access node has a low bandwidth, then a handover threshold associated with the target access node is raised, such that a handover of the wireless device to the target access node is prevented or discouraged. Adjusting the handover threshold may include increasing or raising a threshold signal level associated with the target access node. The adjustment may further comprise decreasing or lowering a threshold signal level of the serving access node, such that the wireless device remains attached to the serving access node for a longer time.

Figure 8:
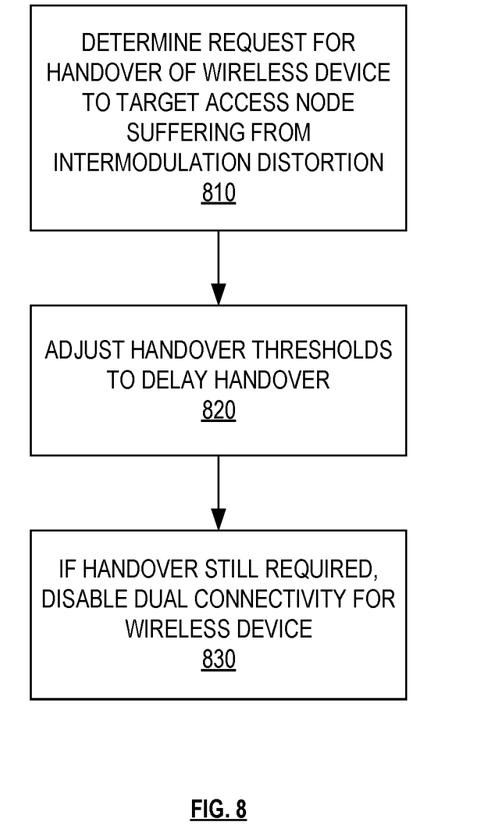
FIG. 8 depicts an exemplary method for disabling dual connectivity for a delayed handover.

FIG. 8 depicts an exemplary method for disabling dual connectivity after a delayed handover. The method of FIG. 8 may be implemented by a processing node communicatively coupled to one or more access nodes, controller nodes, or any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, it is determined that a wireless device is requesting a handover to a target access node suffering from intermodulation distortion. The handover may be requested if signal conditions change for the wireless device, or via any other known mechanism for triggering a handover. For example, the wireless device may be near a cell edge of a serving access node, and determines that the signal level of the target access node is acceptable. However, if the target access node suffers from intermodulation distortion (e.g. passive intermodulation distortion or PIM), then the handover is delayed at 820. The handover may be delayed by modifying the signal condition thresholds, e.g. minimum or maximum signal levels. A signal quality reported by the wireless device is monitored, wherein the handover thresholds are adjusted such that the signal quality does not deteriorate past a threshold. For example, if a target access node has a low bandwidth, then a handover threshold associated with the target access node is raised, such that a handover of the wireless device to the target access node is prevented or discouraged. Adjusting the handover threshold may include increasing or raising a threshold signal level associated with the target access node. The adjustment may further comprise decreasing or lowering a threshold signal level of the serving access node, such that the wireless device remains attached to the serving access node for a longer time.

At 830, if the handover still occurs (e.g. if the modified signal level thresholds are met), and if the intermodulation distortion persists or meets another threshold, then the dual-connectivity mode of operation is disabled. The dual-connectivity mode may be disabled by removing context info related to the wireless device from handover signaling. For example, if the dual-connectivity mode utilizes 4G LTE and 5G NR (e.g. EN-DC), and if the target access node suffers from PIM at a 5G gNodeB (or frequencies associated therewith), then when the wireless device is handed over to the target access node, the 5G NR data value is disabled, such that when the handover is complete, the wireless device attaches only to the 4G LTE carrier deployed by the target access node.

Additional combinations and permutations of the aforementioned operations may be envisioned by those having ordinary skill in the art in light of this disclosure. Further, while 4G LTE and 5G NR are described in the above embodiments, the disclosed operations may apply to different combinations of radio air interfaces, including any combination of radio air interfaces within the same or different radio-access technologies, such as multiple different 4G carriers, 5G carriers, or any future wireless technology.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for ensuring service quality in wireless network suffering from intermodulation distortion, the method comprising,
    determining that a target access node for a handover of a wireless device is experiencing an intermodulation distortion level that exceeds a first threshold, wherein the wireless device and the target access node are configured to utilize a dual-connectivity operating mode with at least two different radio access technologies (RATs) and the intermodulation distortion is associated with a first RAT of the at least two different RATs;
    delaying the handover of the wireless device to the target access node based on the intermodulation distortion exceeding the first threshold;
    determining that the intermodulation distortion level exceeds a second threshold higher than first threshold; and disabling the dual-connectivity operating mode based on the intermodulation distortion exceeding the second threshold.

2. The method of claim 1, wherein delaying the handover comprises adjusting handover thresholds associated with one or both of a source access node or the target access node.

3. The method of claim 2, wherein adjusting the handover thresholds is performed iteratively based on different thresholds of the intermodulation distortion level.

4. The method of claim 1, wherein disabling the dual-connectivity operating mode further comprises removing context information for the first RAT from a handover context message transmitted to the target access node.

5. The method of claim 1, further comprising performing the handover such that the wireless device attaches to the target access node using a second RAT.

6. The method of claim 1, wherein the target access node comprises a separate dual-connectivity access node.

7. The method of claim 2, wherein:
the source access node comprises a primary access node, and
the target access node comprises a secondary access node in a one to many configuration, such that the handover is performed between two secondary access nodes.

8. A system for delaying handovers to target access nodes suffering from intermodulation distortion, the system comprising:
a processing node; and
a processor coupled to the processing node, the processor being configured to perform operations comprising:
determining that an intermodulation distortion level measured at a target access node configured to utilize dual connectivity utilizing at least a first radio access technology (RAT) and a second RAT meets a threshold, the intermodulation distortion being associated with the first RAT; and
for wireless devices attached to a serving access node adjacent the target access node, adjusting handover thresholds to delay handovers of the wireless device to the target access node based on the intermodulation distortion level meeting the threshold;
determining that the intermodulation distortion meets a higher threshold; and
disabling a dual connectivity capability for the wireless device based on the intermodulation distortion level meeting the higher threshold.

9. The system of claim 8, wherein upon being handed over, the wireless device attaches to the target access node using the second RAT.

10. The system of claim 8, wherein the handover thresholds are associated with one or both of the serving access node or the target access node.

11. The system of claim 10, wherein adjusting the handover thresholds is performed iteratively based on different thresholds of the intermodulation distortion level.

12. A processing node for delaying handovers to target access nodes suffering from intermodulation distortion, the processing node being configured to perform operations comprising:
determining a requirement for a handover of a wireless device from a source access node to a target access node that is suffering from threshold levels of intermodulation distortion; and
delaying the handover of the wireless device to the target access node by adjusting handover thresholds;
determining a second requirement for the handover based on the adjusted thresholds; and
restricting or disabling a dual-connectivity capability of the wireless device.

13. The processing node of claim 12, wherein the target access node comprises a separate dual-connectivity access node.

14. The processing node of claim 12, wherein:
the source access node comprises a primary access node, and
the target access node comprises a secondary access node in a one to many configuration, such that the handover is performed between two secondary access nodes.

* * * * *